United States Patent [19]

Bahr et al.

[11] 4,186,406

[45] Jan. 29, 1980

[54] MULTIPLE-ELECTRODE PRINT HEAD FOR ELECTROEROSION PRINTERS

[75] Inventors: Dietrich J. Bahr; Karl H. Burckardt, both of Herrenberg, Fed. Rep. of Germany

[73] Assignee: International Business Machines Corporation, Armonk, N.Y.

[21] Appl. No.: 867,391

[22] Filed: Jan. 6, 1978

[30] Foreign Application Priority Data

Jun. 18, 1977 [DE] Fed. Rep. of Germany ....... 2727558

[51] Int. Cl.[2] ........................................ G01D 15/06

[52] U.S. Cl. ................................. 346/163; 346/154

[58] Field of Search ............... 346/163, 154, 155, 162, 346/164, 139 A, 139 C

[56] References Cited

U.S. PATENT DOCUMENTS

| | | | |
|---|---|---|---|
| 2,933,559 | 4/1960 | Campbell | 346/162 |
| 3,732,573 | 5/1973 | Merka | 346/162 |
| 3,797,021 | 3/1974 | Hida | 346/162 |
| 3,946,403 | 3/1976 | Ikeuchi | 346/154 |
| 4,115,763 | 9/1978 | Brown, Jr. | 346/154 |

FOREIGN PATENT DOCUMENTS

| | | | |
|---|---|---|---|
| 2215519 | 10/1973 | Fed. Rep. of Germany | 346/163 |

*Primary Examiner*—John H. Wolff

*Attorney, Agent, or Firm*—Kenneth P. Johnson

[57] ABSTRACT

Apparatus for and method of providing multiplex control for the plurality of electrodes in an electroerosion print head. This technique allows the elimination of a number of control leads originally required and reduces the cost of electrode drivers. Electrode spacing is modified slightly to accommodate the multiplexing control.

2 Claims, 4 Drawing Figures

MULTIPLE-ELECTRODE PRINT HEAD FOR ELECTROEROSION PRINTERS

BACKGROUND OF THE INVENTION

The invention relates to a multiple-electrode print head for electroerosion printers (metal paper printers). The invention also relates to a method of controlling such a multiple-electrode print head and to a control circuit for controlling the same.

In known electroerosion printers with a multiple-electrode print head one driver is associated with each electrode (IBM Technical Disclosure Bulletin, Vol. 16, No. 5, p. 1594–5, October 1973). Via the associated drivers print pulses are applied to the individual electrodes at different times. In conventional electroerosion printers the print head moves across the record carrier, the electrodes of the print head being connected to the associated driver circuits via separate lines which are moved together with the print head. For space and weight reasons the drivers cannot be arranged on the print head. Because of this, a multiple-electrode print head with a great number of electrodes requires an equally great number of lines linking up with the individual electrodes.

SUMMARY OF THE INVENTION

It is a primary object of this invention to provide a control circuit for a multi-electrode print head which decreases the number of electrode control lines from the number heretofore required.

It is a further object of this invention to provide a control circuit for a multi-electrode print head in which electrodes are individually addressed and receive their energization signals over a common line.

A still further object of this invention is to provide a multiplexing addressing arrangement for a multi-electrode print head in which pairs of electrodes can be energized successively by opposite polarities in a common circuit.

Yet another object of this invention is to provide an improved method of addressing individual electrodes in a multi-electrode print head which employs multiplexing for activating the electrodes through a decoding circuit and common control line.

The foregoing objects are attained in accordance with the invention by providing a print head with a plurality of electrodes each displaced laterally along the print line by a predetermined distance and using a multiplexing circuit to successively condition each of said electrodes for energization to produce a record mark. The circuit further provides for a single line commonly arranged to carry all energizing signals to all electrodes but effective to initiate energization of the electrodes only upon selection by decoding means. The decoding means is operable to condition the individual electrodes in accordance with binarily coded signals on a plurality of input lines less in number than the number of electrodes to be controlled. In addition, circuit means are provided for energizing a pair of electrodes through a portion of a circuit common to both electrodes by rendering the individual electrodes of the pair responsive only to a particular polarity of electrical signal energization.

The foregoing and other objects, features, and advantages of the invention will be apparent in the following more particular description of a preferred embodiment of the invention, as illustrated in the accompanying drawings.

DESCRIPTION OF THE PREFERRED EMBODIMENT

Figure 1:
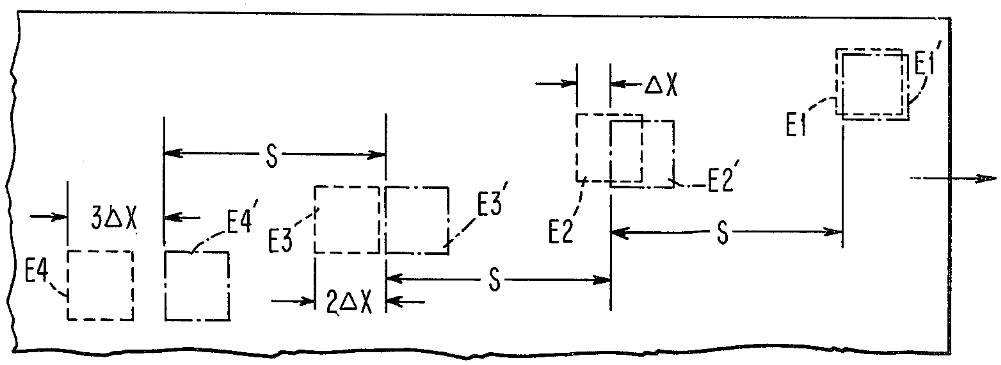
FIG. 1 is a diagrammatic representation of a print head with electrodes arranged on a slope and which are staggered by different amounts in relation to each other.

FIG. 1 shows a print head 10 with electrodes E1, E2, E3, E4 . . . arranged on a slope. The electrodes are horizontally staggered in relation to each other by different amounts as compared to former arrangements. For clarity's sake, the multiple-electrode print head in accordance with the invention will be compared with a print head, as previously proposed, in which the mutual electrode stagger is constant. For ready comparison, the electrodes of the latter kind of head are marked by a dash-dotted line in FIG. 1.

Thus, the multiple-electrode print head with uniform electrode stagger consists of the dash-dotted electrodes E1', E2', E3', E4', etc. The various electrodes are horizontally staggered in relation to each other by the value S. A print head on which the electrodes are arranged in this manner requires one electrode lead for each electrode, whereby each lead is connected to a corresponding driver. It is assumed that print head 10 moves across the record carrier in the arrow-marked direction. Via their associated drivers the individual electrodes E1', E2', E3', and E4' receive a short print pulse at particular times. Such a print head has as many electrode leads as there are electrodes.

Figure 2:
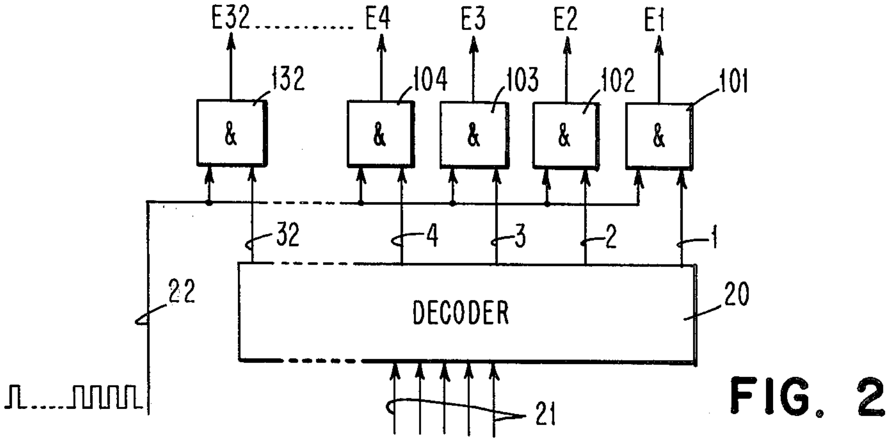
FIG. 2 is a diagrammatic representation of a control circuit with the electrode address lines and the common pulse line.

With the arrangement in accordance with the invention which provides for the individual electrodes to be arranged on the print head, the number of print head leads is minimized. For this purpose a decoder 20, FIG. 2 is required which is designed in a conventional and simple manner and which is arranged on the movable electrode print head. The address of an electrode to be controlled is binarily coded on leads 21 to decoder 2D; a further line 22 serially carries a sequence of print pulses for the individual electrodes.

Electrodes E1, E2, E3, E4, etc. of the multiple-electrode print head in accordance with the invention are shown by broken lines in FIG. 1. In comparison with an electrode arrangement for a multiple-electrode print head with uniformly staggered electrodes E1', E2', E3', E4', etc., the former electrodes are additionally horizontally staggered in relation to each other. Thus, electrode E2 in relation to electrode E1' is staggered by S and, additionally, by the distance $\Delta x$. In relation to electrode E2' electrode E3 is horizontally staggered by $S+2\Delta x$; in relation to electrode E3' electrode E4 is horizontally staggered by $S+3\Delta x$.

Electrodes E1, E2, E3, E4, etc. arranged in this manner can be controlled via a common print pulse control line. For simultaneously applying a print pulse to electrode E1' and E2' in a conventional print head, each electrode would have to have its own lead. If, however, electrode E2 is additionally staggered by Δx in relation to electrode E2', such an electrode arrangement permits electrode E2 to be activated later than electrode E1, namely, at a time when E2 has moved by Δx to the position indicated by the assumed electrode E2'. Only at that time, i.e., after the time Δt has passed which the print head requires to be moved by Δx, will a short print pulse be applied to electrode E2. In other words, when the print pulse for electrode E1 is applied at the time t1 (=t), electrode E2 receives a short print pulse at a later time (t2=t+Δt), with times t1 and t2 differing from each other by Δt. Electrode E3 receives its print pulse only after it has reached the position of the assumed electrode E3' and the print head has been moved by 2Δx in the time 2Δt, i.e., at the time t3=t+2Δt, etc.

As the individual short print pulses are successively applied to electrodes E1, E2, E3, etc., said electrodes can be controlled via a common print pulse control line. The print pulses are applied to the corresponding electrodes via an addressing logic which will be described further in connection with FIGS. 2 and 3.

It is pointed out in this connection that the print head in accordance with the invention is shown in comparison with conventionally arranged electrodes E1', E2', E3', E4'. The print image to be produced by the electrodes is assumed to be the same with the conventional print head and the one in accordance with the invention. FIG. 2 is a diagrammatic representation of how the electrodes are addressed and of how print pulses are applied to them. The embodiment concerns a print head with 32 electrodes. The address of an addressed electrode is binarily coded on five lines ($2^5=32$) 21. This binarily coded address is fed to a conventional decoder 20 which in accordance with the 32 electrodes provided comprises 32 output lines 1, 2, 3 to 32. The decoder serves to activate for an electrode address binarily coded lines 21 the decoder output line associated with that address. Each output line of decoder 1 to 32 is connected to an AND gate 101, 102, 103 to 132. The common print pulse line 22 links up with the second input of the various AND gates.

Figure 3:
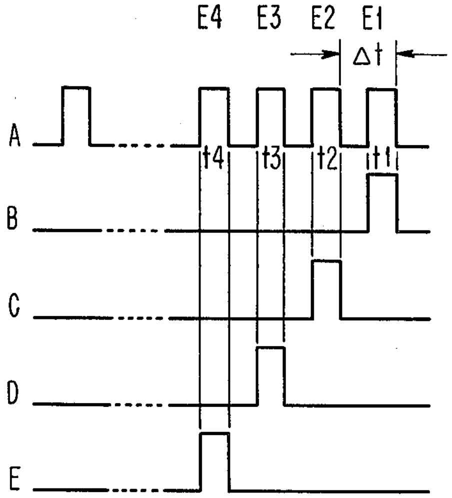
FIGS. 3 A–E are diagrammatic representations of a pulse sequence for controlling the electrodes.

The print pulse sequence will be described in detail in connection with FIG. 3. When a print pulse is present and a decoded output line has been activated, the corresponding AND gate is opened for the print pulse; the output of the AND gate is connected to one of the electrodes E1–E32. If, for example, output line 2 of decoder 20 is activated at a particular time and if at that time a print pulse exists on the common line 22, AND gate 102 is opened for said print pulse and electrode E2 is energized.

The time relations of the print pulse sequence will be described below. It was previously mentioned that the individual electrodes E1, E2, E3, E4, etc. are activated at different times. If electrode E1 is activated at the time t1, electrode E2 is activated at the time t2, electrode E3 at the time t3, etc., the time difference between successive times is always Δt. At the respective times a particular electrode can, of course, be activated by means of a print pulse or not (missing print pulse). In the example in FIG. 3 it is assumed that all electrodes E1, E2, E4, etc. are to be activated by a pulse at the corresponding times. For this purpose, a print pulse sequence (FIG. 3A) would have to be provided in which short print pulses occur at the times t1, t2, t3, t4, etc. The time difference between successive print pulses is Δ, as previously mentioned. When such a pulse sequence is present on the common activation line 22 (FIG. 2), t activation of the individual electrodes would necessitate that the electrodes are addressed synchronously with said pulse sequence. This means the first electrode E1 would have to be addressed at the time t1, the second electrode E2 at the time t2, the third electrode E3 at the time t3, etc. The means used for such synchronization are conventional and do not form part of this invention, so that they will not be described here in detail.

FIG. 3B shows the voltage course on the output of AND gate 101 associated with electrode E1. At the time t1 the address signal for electrode E1 is applied to AND gate 101, while the print pulse for said electrode E1 is applied to line 22. These two conditions cause the AND gate to pass the print pulse for electrode E1 to its output. This holds in analogy for the voltage courses of FIGS. C, D and E showing the output signal of AND gate 102 for electrode E2, of AND gate 103 for electrode E3 and of AND gate 104 for electrode E4.

As previously mentioned, the print pulses are short, occurring at intervals of Δt. The time relations of such a pulse sequence are limited by the number of electrodes to be controlled, the length of the individual print pulses and the time by which they are spaced from each other. This spacing Δt may only be so small that successive pulses can still be readily separated by the control electronics. The length of a print pulse must not be less than the time required for generating a printed point. One pulse sequence permits addressing as many electrodes as can be handled in the unit of time which passes when the print head moves on by S. Only in this manner is it possible to readily associate an electrode with the respective print pulse provided for it. A further control circuit in accordance with FIG. 2 would have to be provided for the number of electrodes exceeding the indicated limit.

FIG. 2 shows how the number of electrode leads is minimized. It is assumed that the decoder and the various AND circuits are produced in integrated technology and that they are arranged on the movable print head. Thus, only address lines 21 and common print pulse control line 22 are connected to the print head. This means 32 electrodes require as few as five address lines 21 and one print pulse control line 22 or a total of six connecting lines. A conventionally designed print head would require a far greater number of lines, namely, 32 driver lines.

Figure 4:
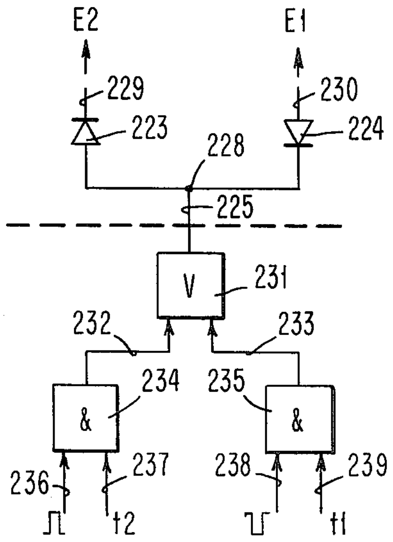
FIG. 4 is a diagrammatic representation of the control of two electrodes by means of two diodes and a common diode line.

FIG. 4 shows a circuit permitting two electrodes to be controlled by means of two diodes and one common diode line. Such a circuit realizes the concept of activating two adjacent electrodes E1 and E2 via one common print head line 225 at different times t1 and t2. The activation pulse applied at the time t1 and the activation pulse at the time t2 have different polarities. The polarity of the print pulse at the time t1 would be such that this pulse could pass diode 224, i.e., it would have to have a negative amplitude. Thus, the print pulse at the time t2 would be positive and able to pass diode 223. FIG. 4 shows that diodes 224 and 223 are oppositely switched, diode 224 passing only negative pulses in the direction of electrode E1, and diode 223 passing only positive pulses in the direction of diode E2. The generation of pulses of different polarity at particular times is known from the art and does not form part of the present invention, so that it will not be described here in detail. The positive print pulse for electrode E2 is applied to line 236. Line 236 is connected to AND gate 234 whose second input receives a synchronization pulse on line 237 at the time t2. Via line 232 the output of AND gate 234 is applied to an amplifier circuit 231 whose output is connected to the print head via line 225 linking up with the two diodes 223 and 224. The positive print pulse is fed to electrode E2 via diode 223 and 229.

The negative print pulse is applied to AND gate 235 via line 238. At the time t1 the second input of AND gate 234 receives a synchronization pulse via line 239. Via line 233, the output of AND gate 234 is connected to amplifier 231 and thence, via the common output line 225, to the two diodes 223 and 224, of which only diode 224 passes the negative signal, so that it is applied to electrode E1 via diode 224 and line 230. This circuit used to control two electrodes with oppositely connected diodes and pulses of opposite polarity reduces the number of leads to the print head by the factor 2. The diodes can be readily manufactured in integrated technology and be arranged on the print head. In this connection it is pointed out once again that the actual lead to the electrode head is line 225.

While the invention has been particularly shown and described with reference to a preferred embodiment thereof, it will be understood by those skilled in the art that changes in form and details may be made therein without departing from the spirit and scope of the invention.

What is claimed is:

1. In a print head movable along a print line on a print medium, apparatus for controlling the energization of print electrodes comprising;

a plurality of electrodes in said print head, each being displaced a different predetermined distance along said print line from the leading electrode in said plurality;

coincidence circuit means for each said electrode operable to provide an energizing signal to its said electrode upon occurrence of a pair of coincident input signals and including polarity-sensitive means for connecting pairs of said coincidence circuit means to the respective electrodes thereof through a common control lead with each electrode of said pair arranged to be responsive to a signal having a polarity opposite to that of the other electrode of said pair;

decoding means having a plurality of outputs, each connected to one input of each of said coincidence circuit means and operable upon receipt of binary coded signals for successively providing one of said input signals to a different said coincidence circuit means;

a plurality of address lines connected to said decoding means for providing thereto predetermined binary coded signals; and a control signal line commonly connected to all of said coincidence circuit means for transmitting thereto electrode energizing signals of selective opposite polarities as another of said input signals.

2. Apparatus as described in claim 1 wherein said coincidence circuit means includes rectifying means for rendering said electrodes of each said pair selectively energizable according to the polarity of the energizing signal along said common control lead.

* * * * *